Oct. 30, 1934.  J. F. HAYNES  1,979,199
VEGETABLE CUTTER
Original Filed March 25, 1932

James F. Haynes
INVENTOR
BY Victor J. Evans & Co.
ATTORNEY

Patented Oct. 30, 1934

1,979,199

UNITED STATES PATENT OFFICE 1,979,199

VEGETABLE CUTTER

James F. Haynes, Murfreesboro, Tenn.

Application March 25, 1932, Serial No. 601,251
Renewed March 16, 1934

1 Claim. (Cl. 146—147)

The invention relates to a cutting machine, and more especially to a vegetable slicer or cutter.

The primary object of the invention is the provision of a machine of this character, wherein vegetables when placed therein can be sliced or cut in a shape correspondingly to the arrangement of the cutters or knives, for example, cubes or elongated strips of substantially square or rectangular shape in cross section, such as in preparing potatoes to be fried and sliced or cut, the vegetables being held in a novel manner so that the same can be discharged in bulk after the cutting operation.

Another object of the invention is the provision of a slicer or cutter of this character, wherein the cutting bed or block is provided with a series of kerfs so arranged as to accommodate the coaction therewith of a knife frame, the latter being interchangeable with varying sized knives for altering the cubes either large or small for the slicing or cutting of vegetables into cubes of varying sizes when the cutter or slicer is operated.

A further object of the invention is the provision of a cutter or slicer of this character, wherein the hopper for vegetables to be cut or sliced is of a construction to accommodate a knife frame which is readily removable to permit interchanging of selected frames having their knives disposed to increase or decrease the sizes of the cubes when being cut, the hopper being supported upon a movable member which functions as a lever to advance the knife frame to the cutting bed, the latter being of novel construction.

A still further object of the invention is the provision of a cutter or slicer of this character which is extremely simple in construction, thoroughly reliable and efficient in operation, portable, light of weight yet strong, durable, readily and easily operated, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:—

Similar reference characters indicate corresponding parts throughout the several views in the drawing.

Figure 1:
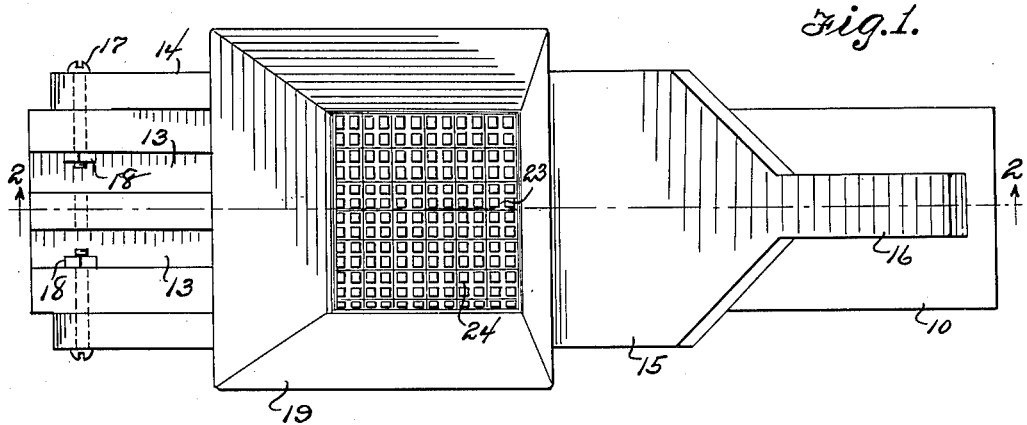
Figure 1 is a top plan view of a cutter or slicer constructed in accordance with the invention.
Figure 2:
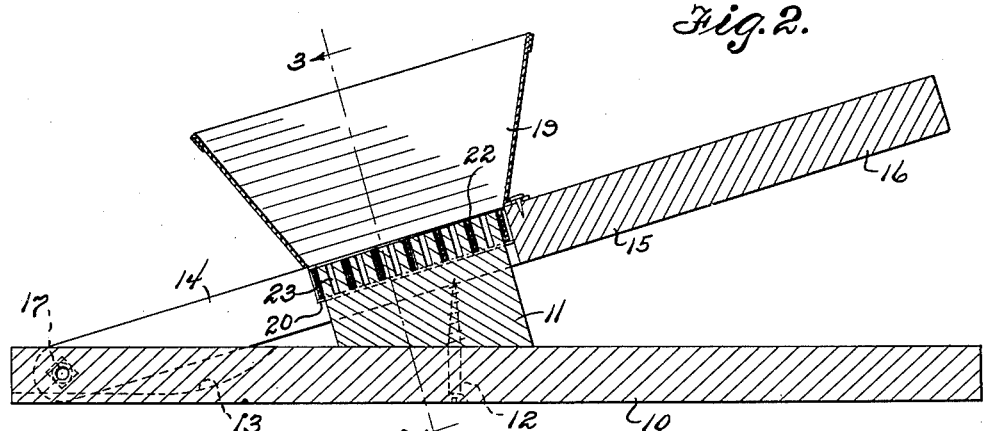
Figure 2 is a sectional view on the line 2—2 of Figure 1 looking in the direction of the arrows.
Figures 3, 4:
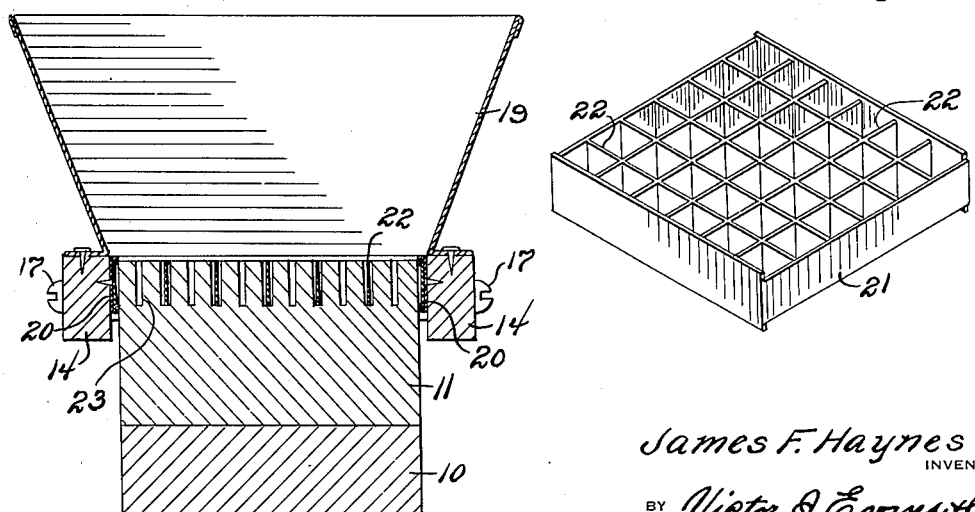
Figure 3 is an enlarged vertical transverse sectional view on the line 3—3 of Figure 2 looking in the direction of the arrows.
Figure 4 is a perspective view of the knife frame.

Referring to the drawing in detail, the cutter or slicer comprises a supporting base preferably in the form of a slab 10, in this instance being made of wood although the same may be made of metal or any other material found desirable and is provided thereon with a cutting bed or block 11, the same being angularly disposed to the top face of said supporting base in this instance, but it may be otherwise disposed, and is held in proper position by a fastener such as a screw 12 engaged therein from the under face of the base. This base 10, at one end, is provided with spaced parallel channels 13, these opening through the end and swingingly connected at this channeled end is the fork 14 of a swinging member 15 constituting a lever provided with a handle 16 at the end opposite the fork 14.

The fork 14 is connected with the base 10 by pivots 17 in the form of bolts carrying nuts 18 confined in the channels 13. The member 15 supports thereon a hopper 19, the latter registering with the fork 14 of the member 15 next to the closed end of the fork. Located on the inner face of the tines of the fork 14 immediately beneath the hopper 19 are retaining cleats 20 in which is removably fitted a knife frame 21 having permanently arranged therein the crossed knives 22 to provide squared spaces therebetween, the cutting edges of the knives 22 being directed downwardly. The crossed relation of the knives 22 can be varied to increase or decrease the size of the spaces therebetween.

The bed or block 11, in its uppermost side, has formed therein closely arranged spaced parallel crossed kerfs 23 and 24 respectively, these being at right angles to each other and function to accommodate the knives 22 according to the crossed disposition thereof in the frame 21, thus it being readily seen that according to the nature of the knife frame 21, small or large cubes will be sliced or cut. The cutter or slicer is designed for the cutting of vegetables into cubes according to the sizes desired and in the operation of this slicer or cutter, the member 15 is raised by being swung upwardly on its pivot 17 and the vegetable to be cut is placed upon the block 11 and the formation of its kerfed upper side will retain the vegetable resting thereon. Now upon lowering the member 15 the knives 22 in the knife frame 21 will sever the vegetable and the cut or sliced pieces thereof will enter the hopper 19 for retention therein to permit the delivery of the cut vegetables in bulk from the hopper. The kerfs 23 and 24 in their depth are alike to the depth of the knives 22 so that a complete severance of the vegetable is assured in the operation of the slicer or cutter.

It is, of course, to be understood that changes, variations and modifications may be made in the invention as come properly within the scope of the appended claim without departing from the spirit of the invention or sacrificing any of its advantages.

From the foregoing, it is thought that the construction and manner of operation of the device will be clearly understood and therefore a more extended explanation has been omitted.

What is claimed is:—

A vegetable cutter comprising a board-like base forming a slab, a cutting block angularly disposed to the base and carried thereby, said base being formed with spaced parallel channels opening through its upper face and one end thereof, a swinging member having a fork receiving the channeled end of the base, pivots connecting the fork with the base, said cutting block having spaced parallel closely arranged crossed kerfs in the upper face thereof, retaining cleats arranged in the fork, a knife frame removably fitted in said retaining cleats, permanent closely arranged spaced parallel crossed knives in said frame to interfit the kerfs, and a hopper on the member and rising above the knife frame.

JAMES F. HAYNES.